(12) United States Patent
Haubs et al.

(10) Patent No.: US 7,943,726 B2
(45) Date of Patent: May 17, 2011

(54) PROCESS FOR PREPARATION OF OXYMETHYLENE POLYMERS IN A HOMOGENEOUS PHASE, AND USE

(75) Inventors: Michael Haubs, Bad Kreuznach (DE); Joachim Clauss, Darmstadt-Eberstadt (DE); Michael Hoffmockel, Niedernhausen (DE); Jürgen Lingnau, Malnz (DE); Arnold Schneller, Messel (DE)

(73) Assignee: Ticona GmbH, Keisterbach (DE)

( * ) Notice: Subject to any disclaimer, the term of this patent is extended or adjusted under 35 U.S.C. 154(b) by 701 days.

(21) Appl. No.: 11/643,223

(22) Filed: Dec. 21, 2006

(65) Prior Publication Data

US 2007/0185308 A1 Aug. 9, 2007

Related U.S. Application Data

(60) Provisional application No. 60/765,419, filed on Feb. 3, 2006.

(30) Foreign Application Priority Data

Dec. 24, 2005 (DE) .......................... 10 2005 062 327

(51) Int. Cl.
*C08G 59/00* (2006.01)

(52) U.S. Cl. .......................... 528/365; 528/425; 528/232

(58) Field of Classification Search .................. 528/230, 528/425
See application file for complete search history.

(56) References Cited

U.S. PATENT DOCUMENTS

| 3,161,616 | A | | 12/1964 | Brown et al. |
| 3,393,179 | A | | 7/1968 | Leverett |
| 3,998,791 | A | | 12/1976 | Radici et al. |
| 4,097,453 | A | | 6/1978 | Radici et al. |
| 4,431,794 | A | | 2/1984 | Sadlowski et al. |
| 5,587,449 | A | * | 12/1996 | Fleischer et al. ............... 528/232 |

FOREIGN PATENT DOCUMENTS

| DE | 1158709 | 12/1963 |
| DE | 1445255 | 11/1968 |
| DE | 3147309 | 6/1983 |
| GB | 1009884 | 11/1965 |
| JP | 04/114003 | 4/1992 |
| JP | 04/145114 | 5/1992 |

* cited by examiner

*Primary Examiner* — Randy Gulakowski
*Assistant Examiner* — Shane Fang
(74) *Attorney, Agent, or Firm* — Dority & Manning, P.A.

(57) ABSTRACT

A process and an apparatus are described for preparation of oxymethylene polymers. This process encompasses polymerization, in a homogeneous phase, of a monomer which forms oxymethylene groups, as far as 90% of maximum conversion in the presence of an acetal of formaldehyde and of an initiator for cationic polymerization, followed by deactivation of the reaction mixture. The resultant oxymethylene polymers have alkyl ether end groups and are extremely stable.

13 Claims, 1 Drawing Sheet

PROCESS FOR PREPARATION OF OXYMETHYLENE POLYMERS IN A HOMOGENEOUS PHASE, AND USE

CROSS-REFERENCE TO RELATED APPLICATION

Figure 1:
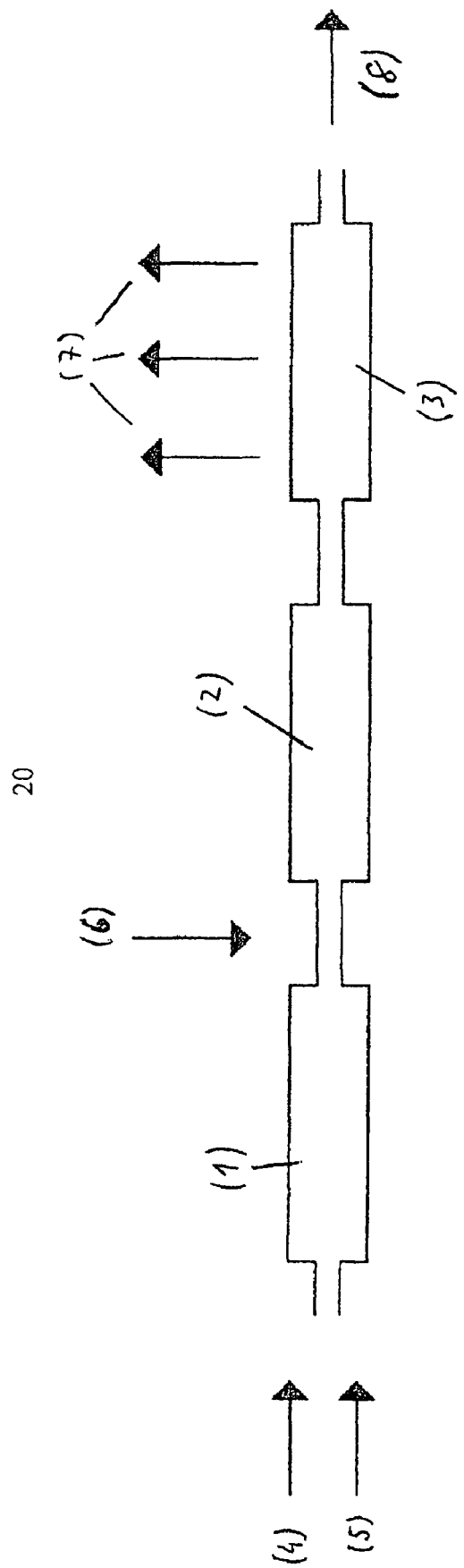

The present application claims benefit to U.S. provisional application Ser. No. 60/765,419, filed Feb. 3, 2006 and German application no. DE 10 2005 062 327.1 filed Dec. 24, 2005.

The present invention relates to an improved process for preparation of oxymethylene polymers, and also to the use of selected oxymethylene polymers.

The preparation of polyoxymethylenes is known per se. They can be prepared firstly via anionic polymerization of anhydrous formaldehyde and secondly via cationic polymerization of cyclic oligomers of formaldehyde, mostly trioxane. This polymerization can take place either in bulk (i.e. without solvent) or else in solution in the form of precipitation polymerization, or else in the melt in a homogeneous phase, under pressure (DE 31 47 309 A1).

The cationically initiated variant of the polymerization uses cationic initiators. A disadvantage with the use of cationic initiators is that these also catalyze side reactions, such as hydride shift, leading to degradation of molecular weight and to formation of formate end groups. After polymerization has taken place it is therefore necessary to deactivate the reaction mixture rapidly and completely. This is typically achieved via addition of bases to the polymerization mixture.

JP-A-04/114,003 and JP-A-04/145,114 describe the deactivation of the polymerization catalyst in oxymethylene homo- or copolymer mixtures via addition of mixtures of selected oxides and melting of the mixture.

It has long been known that the stability of oxymethylene polymers can be increased via capping of the end groups, for example via introduction of ether end groups or of ester end groups. Examples of this are found in DE-B-1,158,709, U.S. Pat. Nos. 3,998,791, 3,393,179, DE-A-1,445,255, DE-B-1,158,709, U.S. Pat. Nos. 4,097,453, and 3,161,616.

Whereas oxymethylene polymers capped with ester end groups are degraded in basic or acidic environments or at elevated temperatures, oxymethylene polymers capped with ether end groups feature very high stability, in particular in a basic medium. However, the processes proposed hitherto for preparation of these polymers have always encompassed a separate step for capping of the polymers. Although this separate reaction leads to markedly raised stability of the polymers, further improvements are nevertheless desirable, since the intention is that formaldehyde emission during further processing and application be minimized and if possible entirely eliminated.

There is moreover a continuing requirement for improved preparation processes in order to counter the omnipresent cost pressure.

Although DE-A-3147309 discloses the preparation of oxymethylene polymers in the melt in a homogeneous phase under pressure, the reaction of the monomers there is carried out to maximum completion and at comparatively high temperatures. It would be desirable to lower the reaction temperatures, in order to raise the molecular weight of the reaction products and in order to provide less opportunity for side reactions and also for the production of formate end groups.

It is an object of the present invention to provide a simple process which can prepare oxymethylene polymers (hereinafter also termed POM) of high stability, and which can be carried out using simple means and at low energy cost.

Another object of the present invention is provision of a process which can prepare POM of high stability and which permits rapid and efficient deactivation of the reaction mixture.

The present invention relates to a process for preparation of oxymethylene polymers of the formula I

$$R^1-(O-CH_2)_n-O-R^2 \qquad (I),$$

which may contain up to 0.5% by weight of copolymerized oxyethylene groups and/or up to 1% by weight of branching agents, in which $R^1$ and $R^2$, independently of one another, are alkyl radicals and n is a whole number greater than or equal to 500, encompassing the following measures:

i) in a homogeneous phase, in the presence of an acetal of formaldehyde and of an initiator for cationic polymerization, polymerization of a monomer which forms $-CH_2-O-$ units, ii) termination of the polymerization in a homogeneous phase prior to achievement of the thermodynamic equilibrium on achievement of less than 90% of maximum conversion, via iii) deactivation of the active polymer chains in a homogeneous phase, by bringing the polymer prepared in step i) into contact with an organic or inorganic base, which can be in either dissolved or dispersed form.

$R^1$ and $R^2$, independently of one another, are alkyl radicals, preferably $C_1$-$C_6$-alkyl radicals, which are in particular straight-chain radicals. $R^1$ and $R^2$, independently of one another, are very particularly preferably methyl, ethyl, propyl, or butyl.

Index n is the number-average degree of polymerization and is preferably in the range from 500 to 10 000, in particular in the range from 500 to 3000. For specific applications, this number-average value can also have been adjusted to a lower value.

Step i) of the inventive process involves a polymerization known per se of monomers which form $-CH_2-O-$ units, if appropriate in the presence of branching agents. The polymerization takes place in a homogeneous phase, preferably in the melt.

To this end, a monomer which forms $-CH_2-O-$ units or a mixture of various monomers is reacted with conventional initiators for cationic polymerization and with acetals of formaldehyde as regulators in a manner known per se. The polymerization takes place at pressures of from 2 to 500 bar, preferably at pressures of from 3 to 100 bar.

The polymerization temperature is sufficiently high that the polymer is present in molten form or in solution in the reaction mixture, i.e. the reaction mixture is a single-phase mixture.

Typical polymerization temperatures for the melt polymerization are above 120° C., preferably in the range from 125° C. to 180° C., particularly preferably in the range from 135° C. to 160° C and very particularly preferably in the range from 140 to 150° C. Preferred pressures for the melt polymerization vary in the range from 3 to 100 bar, particularly preferably in the range from 4 to 60 bar.

The temperature range below 150° C. is particularly suitable for the inventive process, since the extent of side reactions here is comparatively small and the process gives particularly stable products.

In the inventive process, the polymerization mixture is not reacted completely as far as achievement of the thermodynamic equilibrium. The reaction is therefore prematurely terminated via addition of an organic or inorganic base, i.e. at a conversion which corresponds to up to 90% by weight of the conversion (maximum conversion) achievable under the given reaction conditions (pressure, temperature). The reaction is preferably terminated on achievement of from 50 to 80%, in particular from 60 to 75%, of maximum conversion. This measure permits lowering of the reaction temperature, since the temperatures at which the mixture composed of unreacted monomer and of polymer remains homogeneous are lower than those for the completely reacted polymer.

In one preferred process variant, reaction time and initiator concentration are selected so that the concentration of formate end groups in the polymerization mixture on completion of step i) is not more than 40 mmol/kg, preferably not more than 30 mmol/kg, and particularly preferably not more than 20 mmol/kg. Formate end groups are produced via a side reaction (hydride shift) and can contribute to instability of the polymers. They are therefore degraded via thermal hydrolysis or thermolysis of the reaction mixture after deactivation step iii).

For preparation of the oxymethylene polymers, a monomer which forms —CH$_2$—O— units or a mixture of various monomers is reacted in the manner described above.

The oxymethylene polymers are generally unbranched linear polymers which generally contain at least 99 mol %, preferably at least 99.7 mol %, in particular at least 99.9 mol %, of oxymethylene units (—CH$_2$—O—). If desired, small amounts of branching agents can be used. Examples of branching agents used are tri- or polyhydric alcohols or their derivatives, preferably tri- to hexahydric alcohols or their derivatives. Preferred derivatives are formals in which two OH groups have in each case been reacted with formaldehyde, and also epoxides. The amount of branching agents is usually not more than 1% by weight, based on the total amount of monomer used for preparation of the oxymethylene polymers, preferably not more than 0.3% by weight.

The invention also encompasses the preparation of these oxymethylene polymers which also contain very small amounts of oxyethylene units alongside oxymethylene units. The proportion of oxyethylene units is below 0.5% by weight, preferably below 0.2% by weight, and particularly preferably below 0.1% by weight.

The molecular weights of these polymers, expressed via the volume melt index MVR, can vary widely. The polymers typically have repeat structural units of the formula —(CH$_2$—O—)$_n$—, where n is the average degree of polymerization (number average) and preferably varies in the range from 500 to 10 000, in particular from 500 to 3000.

The oxymethylene polymers prepared according to the invention derive from formaldehyde or from its cyclic oligomers, such as trioxane or tetroxane.

It is preferable to prepare oxymethylene polymers in which at least 80%, preferably at least 90%, very particularly preferably at least 95%, and in particular at least 99%, of all of the end groups are alkyl ether groups, in particular methoxy groups or ethoxy groups. Oxymethylene polymers prepared with very particular preference derive from trioxane.

Particularly preferred monomers which form —CH$_2$—O— units are formaldehyde or, very particularly preferred, trioxane.

The polymerization mixture is in liquid form during the polymerization in a homogeneous phase and remains in this condition during the course of the polymerization.

The molecular weight of the resultant homopolymers can be adjusted via use of acetals of formaldehyde (chain-transfer agents). These also lead to production of etherified end groups on the homopolymer, thus permitting omission of a separate reaction with capping reagents.

Monomeric or oligomeric acetals of formaldehyde are used as chain-transfer agents.

Preferred chain-transfer agents are compounds of the formula II

$$R^1-(O-CH_2)_q-O-R^2 \qquad (II),$$

in which $R^1$ and $R^2$, independently of one another, are monovalent organic radicals, preferably alkyl radicals, such as butyl, propyl, ethyl, and in particular methyl, and q is a whole number from 1 to 100.

Particularly preferred chain-transfer agents are compounds of the formula II in which q=1, and methylal is very particularly preferred.

The amounts usually used of the chain-transfer agents are up to 5000 ppm, preferably from 100 to 3000 ppm, based on the monomer (mixture).

The cationic initiators usually used in preparation of oxymethylene homopolymers can be used as initiators. Examples of these are proton acids, such as fluorinated or chlorinated alkyl- and arylsulfonic acids, e.g. trifluoromethanesulfonic acid, trifluoromethanesulfonic anhydride, or Lewis acids, e.g. stannic tetrachloride, arsenic pentafluoride, phosphorus pentafluoride, and boron trifluoride, and also their complexes, e.g. boron trifluoride etherates, and carbocation sources, such as triphenylmethyl hexafluorophosphate.

The amounts usually used of the initiators are from 0.005 to 50 ppm, preferably from 0.01 to 1 ppm, particularly preferably from 0.02 to 0.2 ppm, based on the monomer (mixture).

To terminate the polymerization, the homogeneous, liquid reaction mixture, which also comprises unreacted monomers, such as trioxane and formaldehyde, alongside polymer, is brought into contact with an organic or inorganic base. These can be in undiluted form or in a form diluted with an inert aprotic solvent when they are admixed with the polymerization mixture. The result is rapid and complete deactivation of the active chain ends.

The bases used can comprise compounds of this type which react with the active chain ends in such a way as to terminate the polymerization reaction. Examples are the organic bases triethylamine or melamine, and also the inorganic bases potassium carbonate or sodium acetate. It is also possible to use very mild organic bases, such as carboxamides, e.g. dimethylformamide. Particular preference is given to tertiary bases, such as triethylamine and hexamethylmelamine.

The concentrations used of the bases are from 1 ppm to 1% by weight, based on the polymerization composition. Concentrations of from 10 ppm to 5000 ppm are preferred.

Typical deactivation temperatures vary in the range from 125° C. to 180° C., particularly preferably in the range from 135° C. to 160° C., and very particularly preferably in the range from 140° C. to 150° C.

Typical deactivation pressures vary in the range from 3 to 100 bar, preferably from 4 to 40 bar.

Polymerization and deactivation can take place in the reactors known for preparation of POM homopolymers. Equipment typically used is kneaders, extruders or preferably tubular reactors designed with static mixers, these being designed to be temperature-controllable and pressure-resistant.

Polymerization and deactivation can be carried out in one reactor, for example in a tubular reactor, where the transition between polymerization zone and deactivation zone is gradual and defined merely via the addition of the deactivation solution. However, the two steps of the process can also be undertaken in different assemblies.

It is particularly preferable to execute steps i) and ii) in two reactors arranged in series, in particular in tubular reactors provided with static mixers.

The polymerization time can vary widely and typically varies in the range from 10 seconds to 10 minutes, preferably from 15 seconds to 5 minutes, and particularly preferably from 20 to 100 seconds.

The deactivation proceeds very rapidly and is practically completed with the mixing of the components.

After the deactivation of the initiators and of the POM, no further capping of reactive end groups is then necessary.

After the deactivation of the POM, this is transferred to a depressurization zone for removal of residual monomers and solvent, and residual monomers and solvent are removed via application of a reduced pressure. The removal can also take place in a plurality of stages.

The depressurization zone is formed by a space which is filled by the hot polymer solution or hot polymer melt. Application of subatmospheric pressure, preferably a pressure less than 500 mbar, in particular less than 200 mbar, extracts most of the remaining monomer residues and remaining solvent residues from the polymer solution by utilizing its temperature. This step of the process can be carried out in a separate portion of the tubular reactor, preferably in an extruder. However, it is also possible to use other assemblies, e.g. a flash chamber. In the case of pressurized polymer solutions, these are first depressurized to ambient pressure in the depressurization zone before the residual monomers are extracted by suction.

To this end, the polymer solution is preferably transferred, after step ii), while maintaining the pressure, to an extruder in which depressurization and suction to extract the monomer residues and solvent residues take place.

A twin-screw extruder is particularly preferably used.

Stabilizers and processing aids (also termed "additives" hereinafter) can, if appropriate, be incorporated into the homopolymer before it leaves the depressurization zone.

In one preferred variant of the inventive process, after removal of the monomer residues and of the solvent residues, a mixture of additives is metered into the extruder and is incorporated into the hot polyoxymethylene homopolymer.

Components that can be used in the mixture of additives are the compounds conventionally used for stabilization and/or modification of oxymethylene polymers:

By way of example, these are antioxidants, acid scavengers, formaldehyde scavengers, UV stabilizers, or heat stabilizers. The mixture of additives can comprise, alongside these, processing aids, such as coupling agents, lubricants, nucleating agents, mold-release agents, fillers, reinforcing materials or antistatic agents, or else additives which give the molding composition a desired property, e.g. dyes and/or pigments and/or impact modifiers and/or additives conferring electrical conductivity; or else a mixture of these additives, without restricting the scope to the examples mentioned, however.

Once the monomer residues and solvent residues have been extracted in the depressurization zone, the polymer melt is solidified. This can take place within the depressurization zone or immediately after discharge from the same. The solidified homopolymer, if appropriate comprising additives, is then pelletized in a manner known per se.

Remaining residual monomers and/or oligomers and/or solvents and/or other contaminants can be removed from the homopolymer in an extraction stage.

Pelletization and extraction can take place in assemblies known per se.

The extraction stage is preferably followed by a drying process, in order to free the pellets from residues of adherent extractant.

The POM can then, if appropriate, be remelted in a manner known per se, provided with additives, and repelletized. In this stage of the process it is in particular also possible to add additives which would be dissolved out from the polymer in the extraction stage.

FIG. 1 shows one preferred variant of the inventive process.

This shows a first reactor (1), a second reactor (2) installed downstream of the first, and a third reactor (3) installed downstream thereof.

A mixture composed of monomer which forms —$CH_2$—O— groups, preferably trioxane, together with an acetal of formaldehyde (4), preferably methylal, and with an initiator for cationic polymerization (5), is introduced into the first reactor (1). The polymerization takes place in the first reactor (1) in a homogeneous phase, for example at a temperature of 145° C. and a pressure of from 50 to 60 bar. The average residence time of the reaction mixture in the first reactor is about 50 seconds. After achievement of from 50 to 80% of maximum conversion (=conversion corresponding to achievement of thermodynamic equilibrium), the reaction mixture is transported into the second reactor (2). An amine (6), if appropriate dissolved in trioxane, is added to the reaction mixture. The trioxane content in the second reactor (2) is adjusted so that this is at least 10% by weight, based on the polymer. In the second reactor (2), the temperature of the reaction mixture is kept at 145° C. or slightly increased. The average residence time of the reaction mixture in the second reactor is about 30 seconds. The condition of the homopolymer under the pressure conditions and temperature conditions in the reactor is that of a liquid in a mixture with trioxane. The reaction mixture is then transported into the third reactor (3). Trioxane, monomer residues and, if appropriate, other volatile constituents (7) are drawn off here from the reaction mixture. In the embodiment shown, this takes place in a plurality of stages. In this reactor it is possible (not shown) to provide the POM homopolymer with additives, i.e. to add, for example, stabilizers and processing aids, further filler materials and/or reinforcing materials, and/or other additives and auxiliaries. A stream (8) of the final product is discharged from the reactor.

FIG. 1 therefore describes a preferred process which encompasses the following steps:
  a) using trioxane and methylal as initial charge in a first reactor,
  b) initiating the polymerization via addition of an initiator for cationic polymerization at pressures and temperatures such that the reaction mixture is present as a homogeneous phase,
  c) transferring the reaction mixture comprising the homogeneously dispersed homopolymer from the first reactor to a second reactor after achievement of from 50 to 80% of maximum conversion, and here
  d) a base, either undiluted or diluted with a solvent, is added to the homogeneous reaction mixture, so that the polymerization is terminated,
  e) discharging the reaction mixture from the second reactor, and
  f) freeing the polymer deactivated in step d) from trioxane and from other volatile components.

The inventive processes can produce oxymethylene polymers which have stabilization by ether end groups and have high molecular weight and have extremely high stability. The stability of these polymers is considerably higher than that of the polymers described in U.S. Pat. No. 3,161,616. It is assumed that the inventive process of direct introduction of ether end groups results in a further improvement in polymer stability.

The inventively prepared oxymethylene polymers have not only the ether end groups stated above but also volume melt indices smaller than 100 ml/10 min, preferably being from 1.5 to 40 ml/10 min (determined to DIN EN ISO 1133 at 190° C. with an applied weight of 2.16 kg).

The inventively prepared oxymethylene polymers can be further processed in a manner known per se via molding processes, e.g. via blow molding, injection molding, or extrusion, to give moldings.

The inventively prepared oxymethylene polymers feature high chemicals resistance and high thermal stability, and exhibit excellent impact resistance.

The invention also provides the use, for production of moldings, of the oxymethylene polymers prepared.

The example below illustrates the invention, without restricting it to this embodiment.

EXAMPLE

The reaction was carried out in a tubular reactor equipped with static mixing elements. The tubular reactor was composed of four zones, a premixing zone, a polymerization zone, a deactivation zone, and a zone in which degradation of the unstable chains was undertaken. 300 kg/h of trioxane and 400 g/h of methylal in which 75 ppm of trifluoromethanesulfonic acid had been dissolved were metered by way of two separate metering pumps into the tubular reactor and intimately mixed within a period of 0.5 seconds in the premixing zone. The crude polymer was produced in the polymerization zone directly downstream with a residence time of 40 seconds. The premixing and the polymerization were both carried out at 145° C. The polymerization was prematurely terminated via addition of 300 g/h of triethylamine, again by way of a metering pump. The deactivation had been completed within a few seconds. Degradation of the unstable chains followed directly. To this end, the reactor jacket was heated to 185° C. The residence time in this zone was 20 minutes. A pressure of 20 bar was set by way of a pressure-tension valve at the reactor outlet and the material was depressurized into a twin-screw extruder operated at 200 mbar. At the extruder outlet, the polymer was converted to pellets by means of underwater pelletization. 155 kg/h of polyacetal homopolymer with melt index 8.3 ml/10 min were obtained. The yield of 51.7% can be computed to show conversion of 69% (equilibrium conversion 80%) and a loss of 25% via degradation of unstable chains. The loss was determined by way of the amount of formaldehyde absorbed in the vacuum system.

The invention claimed is:

1. A process for preparation of oxymethylene homopolymers of the formula I

which may contain up to 0.5% by weight of copolymerized oxyethylene groups and/or up to 1% by weight of branching agents, in which $R^1$ and $R^2$, independently of one another, are alkyl radicals and n is a whole number greater than or equal to 500, encompassing the following measures:
i) in a homogeneous phase, in the presence of an acetal of formaldehyde and of an initiator for cationic polymerization, polymerization of a monomer which forms —$CH_2$—O— units,
ii) termination of the polymerization in a homogeneous phase prior to achievement of thermodynamic equilibrium conversion of the monomer which forms —$CH_2$—O— units, the amount of monomer converted being less than 90% of the equilibrium conversion, the termination accomplished via
iii) deactivation of the active polymer chains in a homogeneous phase, by bringing the polymer prepared in step i) into contact with an organic or inorganic base, which can be in either dissolved or dispersed form, deactivation occurring at a deactivation temperature of less than 150° C.

2. The process as claimed in claim 1, wherein the polymerization takes place in a homogeneous phase at temperatures below 150° C.

3. The process as claimed in claim 1, wherein the amount of monomer converted is from 50 to 80% of the equilibrium conversion.

4. The process as claimed in claim 1, wherein the reaction time and initiator concentration during the polymerization are selected so that the concentration of formate end groups is not more than 40 mmol/kg in the polymerization mixture when step i) ends.

5. The process as claimed in claim 1, wherein, as acetal of formaldehyde, a compound of the formula II is used

in which $R^1$ and $R^2$, independently of one another, are alkyl radicals and q is a whole number from 1 to 100.

6. The process as claimed in claim 5, wherein q=1.

7. The process as claimed in claim 1, wherein, as initiator for cationic polymerization, a Lewis acid, a Brönsted acid or a carbocation source is used.

8. A process for preparation of polymers according to claim 1, which comprises
a) charging trioxane and methylal in a first reactor,
b) initiating the polymerization via addition of an initiator for cationic polymerization at pressures and temperatures such that the reaction mixture is present as a homogeneous phase,
c) transferring the reaction mixture comprising the homogeneously dispersed oxymethylene polymer from the first reactor to a second reactor upon conversion of trioxane to an amount of from 50 to 80% of the equilibrium conversion, and here
d) adding a base to the homogeneous reaction mixture,
e) freeing the reaction mixture from volatile components in a vented extruder,
f) discharging the reaction mixture from the second reactor, and
g) freeing the polymer deactivated in step d) from unconverted trioxane and from other volatile components.

9. A molding which comprises the oxymethylene polymers prepared as claimed in claim 1.

10. The process as claimed in claim 1, wherein the polymerization takes place in a homogeneous phase at temperatures in the range from 140 to 150° C.

11. The process as claimed in claim 1, wherein the amount of monomer converted is from 60 to 75% of the equilibrium conversion.

12. The process as claimed in claim 1, wherein $R^1$ and $R^2$ are methyl.

13. The process as claimed in claim 5, wherein the compound of the formula II is methylal.

* * * * *